INVENTOR
HARLAN A. HADLEY

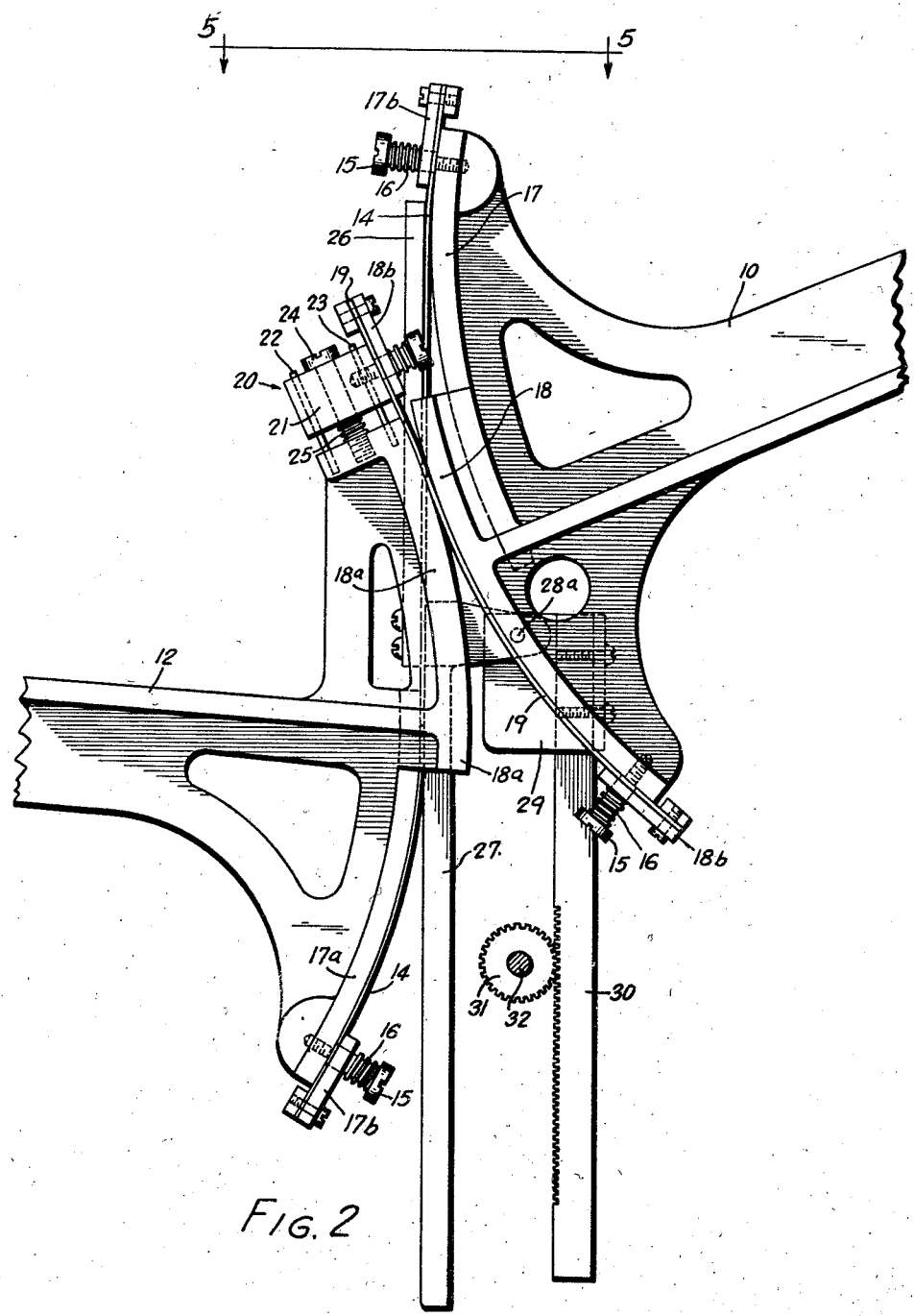

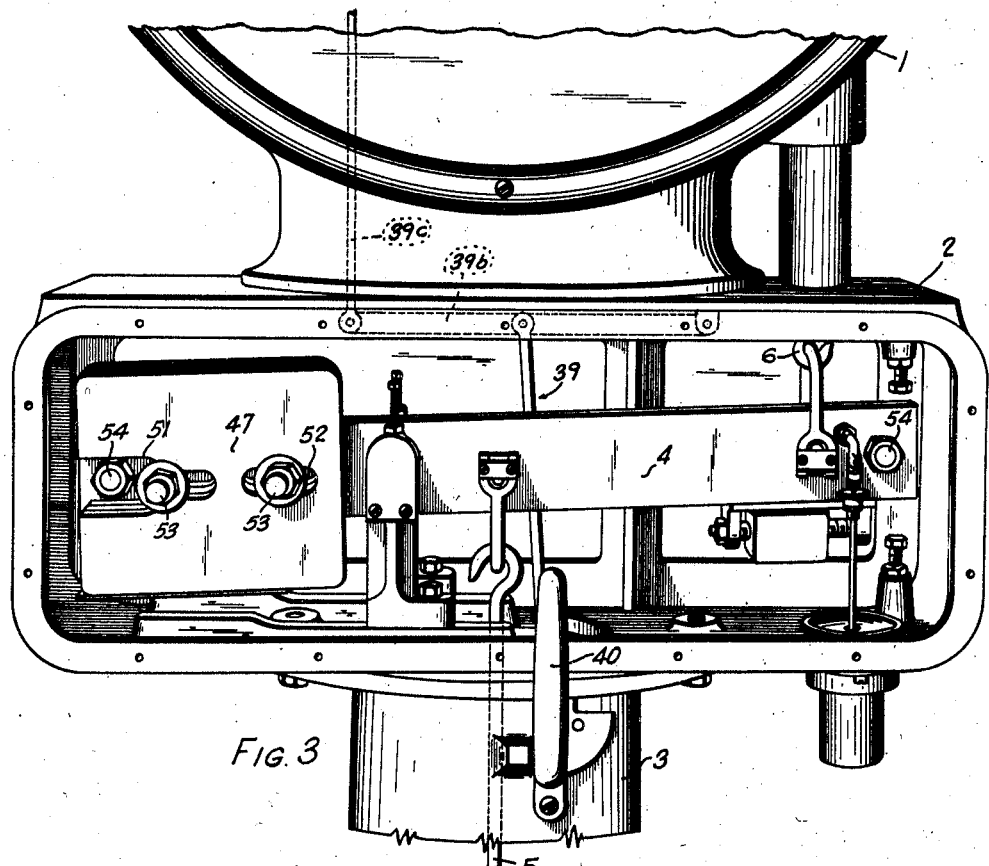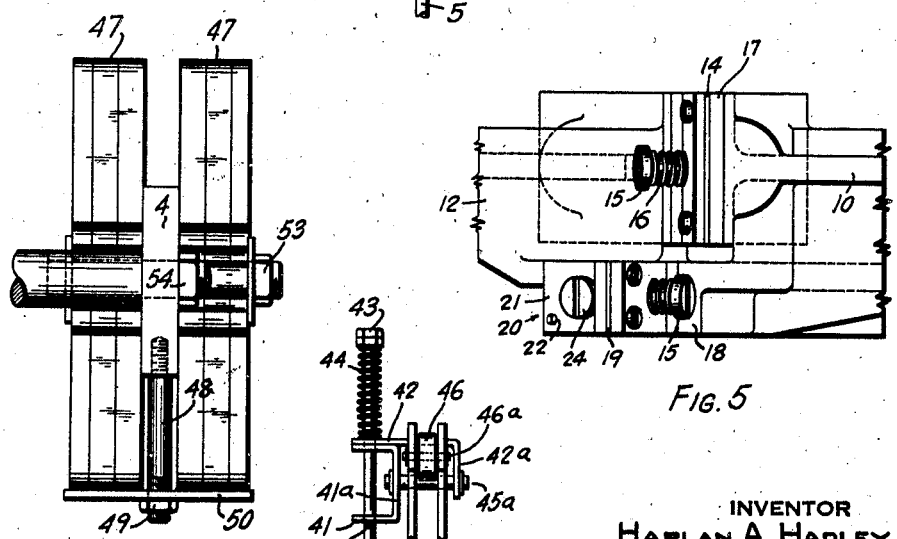

Patented Apr. 6, 1943

2,315,789

UNITED STATES PATENT OFFICE 2,315,789

AUTOMATIC DIAL SCALE

Harlan A. Hadley, River Edge, N. J., assignor to Fairbanks, Morse & Co., Chicago, Ill., a corporation of Illinois Application December 29, 1939, Serial No. 311,454

4 Claims. (Cl. 265—62)

This invention relates to improvements in automatic dial scales of the type wherein dual pendulums are employed as means for counterbalancing load forces.

As is known, in this type of scale the pendulums are interconnected for coordinated movement in opposite directions to counterbalance a load on the scale platform, two pendulums being employed and thusly connected to enable the scale to function properly even when mounted in an out-of-level position. As currently practiced, the pendulums have sector arms extending from their fulcrumed ends and a single flexible metal tape interconnects and rides on the arcuate surfaces of these sector arms. Due to the fact that a flexible connection of this character transmits forces from one pendulum to the other only when held under tension, the pendulums are not positively interlocked for coordinated movement at all times, but are susceptible of independent movement, attended by a buckling of the flexible connection. Such condition is likely to occur when the scale frame or platform is subjected to impact and results in the setting up of detrimental forces in the scale mechanism.

An important object of my invention resides in the provision of improved coupling means for the pendulums which has all of the advantages of the type of connection in current use, yet which has the added advantage of preventing independent, unbalanced movement of the pendulums. This improvement is attained by the provision of two flexible coupling elements arranged in crossed relation so that the pendulums are positively united or interlocked for conjoint movement in both directions.

Another object is attained in the provision of a resilient tensioning means in connection with one of the coupling elements which acts to hold both elements in taut condition and further serves to cushion shocks tending to disturb the reciprocal operating relationship of the pendulums.

Another object is the provision of an improved type of counterbalancing means on one end of the scale lever comprising a plurality of plates mounted thereon for both lengthwise and transverse adjustment to provide greater operating sensitivity of the lever and cooperating parts.

Another object is the provision of an improved manually operated device for locking the dial mechanism and rendering the parts thereof immovable, to prevent possible breakage when the scale is conveyed from one location to another.

The present invention will be more clearly understood and the advantages thereof fully apparent from the following description and the accompanying drawings, in which:

Fig. 2 is an enlarged rear view showing the construction of the pendulum arms and the flexible connections between the arms, as well as the resilient tension adjusting means for the connections;

Fig. 3 is an enlarged rear view of the beam housing with the cover plate removed so as to show the improved counterbalancing means on the end of the lever and the horizontal adjusting devices for the counterbalancing means;

Fig. 4 is an end view of the lever and counterbalancing means showing the vertical adjusting device for the counterbalancing means;

Fig. 5 is a top plan view of the pendulum arms taken on line 5—5 of Fig. 2; and

Fig. 6 is a view of the dial locking device taken on line 6—6 of Fig. 1.

Figure 1:
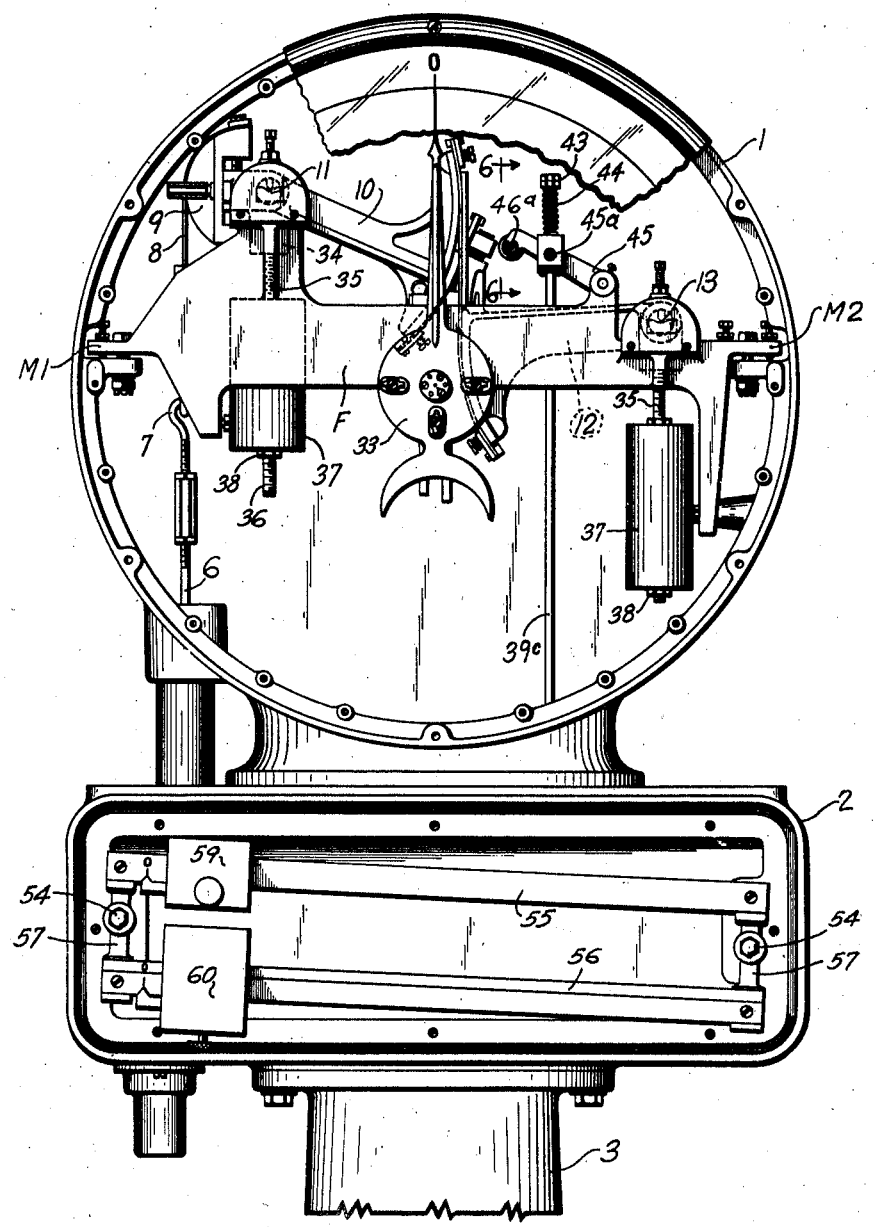
Fig. 1 is a front elevation of a dial scale with the chart partially broken away in order to show the dial mechanism inside the housing.

In the drawings 1 designates the dial housing which is fixedly mounted on the beam housing 2, supported on the scale base (not shown) by a pillar 3. The dial mechanism is supported on a frame F (Fig. 1) which is adjustably mounted on the inside of the dial housing 1 at the points designated M1 and M2.

The lever system may be of any suitable type which when depressed by a load placed on the scale platform transmits the force exerted by the load to the beam lever 4 (Fig. 3) by means of the draft rod 5. The beam lever 4 is operatively connected by an adjustable rod 6, link 7, and metal tape 8 to a pivotally mounted eccentric 9 (Fig. 1) which is connected to one end of a primary sector arm 10, pivotally mounted on a bearing 11 carried by the frame F. Further, the connection between the link 7 and the sector arm 10 is effected by the tape 8 passing around a portion of the circumference of the eccentric 9.

In dial scales, particularly those of portable type, difficulty is encountered in maintaining the accuracy of the scale when it is placed in an out-of-level position. Therefore, in order to produce the necessary compensating effect an auxiliary sector arm 12 is employed, which is pivotally mounted at one end on a bearing 13 carried by the frame F and disposed in a plane below the plane of the primary sector arm 10.

The sector arms 10 and 12 are each provided at their outer ends with two spaced sectors 17 and 18 and 17a and 18a respectively (Figs. 2 and 5), which are cooperatively and diagonally connected by metal tapes 14 and 19. Thus one portion of the metal tape 14 is adapted to engage and follow the face of the upper sector 17 of the sector arm 10, while the other portion engages and follows the face of the cooperating lower sector 17a of the sector arm 12 as the sectors are moved under urge of the load. The tape 14 is secured at the upper end of the sector 17 and at the lower end of the companion sector 17a to an attachment plate 17b, which is resiliently and pivotally mounted on a screw 15 by engaging a spiral spring 16 carried thereon (Figs. 2 and 5). The cooperating tape 19 similarly engages and follows the face of the cooperating sectors 18 and 18a as the sectors are moved and is likewise secured by a screw 15 and accompanying spring 16 to an attachment plate 18b at the lower end of the sector 18 and to a resilient tension adjusting device 20 attached to the upper end of the companion sector 18a.

It is to be noted that since the sector arms 10 and 12 extend in opposite directions and their opposed companion sectors are diagonally connected by the tapes 14 and 19, the placing of the scale on an uneven floor or otherwise in an out-of-level position will not affect the scale balance.

The resilient tension adjusting means 20 (Fig. 2) comprises a block 21 slidably mounted on pins 22 and 23, and an adjusting screw 24. Between the block 21 and upper sector 18a of the sector arm 12 is a coiled tension spring 25, which serves to keep the resilient tension adjusting means 20 as far apart from the upper end of the sector 18a of the sector arm 12 as the length of the tape 19 will allow, thereby keeping a constant tension on the tape 19, which will keep both tapes 14 and 19 taut and prevent them from buckling, even when a sudden stress or load is applied to the scale levers.

Fastened to the flexible tape 14, as by screws or the like, are an upper rack guide bar 26 and a cooperating lower pendant rack guide bar 27 secured to the tape at their lower and upper ends respectively. The lower rack guide bar 27 has integral with its upper end a laterally extending clevis having a bolt 28a extending therethrough. Pivotally mounted on the bolt 28a is a rack coupling member 29, which is adapted to retain a pendant toothed rack bar 30 in engagement with the teeth of a pinion 31 carried by a shaft 32, on the other end of which is mounted the scale indicator 33. The rack guide bars 26 and 27 are adapted to so function that when the sector arms 10 and 12 are raised and lowered under influence of the load one or the other of the guide bars will accordingly always be held in a vertical position with relation to the sector arms, thus holding the rack 30 in constant operative engagement with the indicator pinion 31.

Extending downwardly from extensions 34 on the outer end of each sector arm 10 and 12 is a pendulum rod 35 (Fig. 1) having a threaded portion 36, on which is mounted an adjustable pendulum weight 37 provided with spaced lock nuts 38 engaging the threaded portion 36, for holding the pendulum weight 37 securely in its proper position.

In transporting the scale from place to place it is desirable and necessary to provide means for preventing the delicate dial mechanism and the various cooperating elements from becoming dislocated. For this purpose means is provided for locking the entire dial mechanism through a rod 39 (Figs. 1, 3 and 6). The rod 39 is operatively connected at its lower end to a handle 40 (Fig. 3) which extends through the pillar 3 below the beam housing 2, the rod 39 being adapted to be pulled downwardly when the handle 40 is turned. The rod 39 is connected to three cooperating rod sections, the lower rod section 39a being connected to the handle 40, and the overhead rod section 39b pivoted to the housing, and the upper rod extension 39c, which is connected to the dial locking device (Fig. 6). The upper end of the rod extension 39c has attached thereto at its upper end a transverse pin 39d, two control brackets 41 and 42, and lock nuts 43, while between the control bracket 42 and the lock nuts 43 is provided a compression-tension spring 44. A pair of locking arms 45 (Fig. 6) are pivoted at one end thereof to the frame F and are pivotally connected intermediate their ends to a short rod 45a transversely disposed between the depending arms 41a and 42a respectively, of the control brackets 41 and 42. A roller 46 is mounted on a shaft 46a disposed in the outer ends of the locking arms 45 and is adapted to be forced under urge of the rod 39 against the auxiliary sector arm 12 when the device is operated. When the handle 40 is turned the rod 39 is pulled downward (Fig. 1), together with the free ends of the locking arms 45 (Fig. 6), the roller 46 being depressed against the sector arm 12 and thereby holding the dial mechanism motionless in a locked position, while tension spring 44 provides a constant resilient tension upon the locking arms 45. Since the sector arm 12 is operatively tied by the tapes 14 and 19 to the sector arm 10, both arms, the rack 30, the indicator and other movable parts will all be locked in a fixed position. After the scale has been moved to its new position and is ready for use it is only necessary to turn the handle 40 in the opposite direction and return the rod 39 and locking arms 45 to their original inoperative positions.

Novel means is provided for changing the sensitivity of the beam lever 4 (Figs. 3 and 4), which includes a series of balance plates 47 mounted upon each side of the lever, being arranged in groups of three plates on each side of the lever. Vertical adjustability is provided by screw 48 and nut 49, so that when the nut 49 is turned on the outer threaded portion of the screw 48 the supporting plate 50 on which rest the balance plates 47, is raised or lowered accordingly. The balance plates are provided with elongated openings 51 and 52 for longitudinal adjustability, thereby being adapted to slide forward or backward on the screws 53 the diameter of which is less than the width of the openings 51. When the proper adjusted position of the balance plates is determined the screws 53 are tightened to securely fasten the plates against the beam lever 4. Thus in setting up the scale the parts can be accurately balanced and after the proper positions are once determined can be securely locked in position.

In order to give greater capacity to the scale beyond that of the dial, there are preferably employed an auxiliary beam 55 (Fig. 1) and a tare beam 56 connected at each end by connecting plates 57 and attached to the beam lever 4 by studs 54, the beams 55 and 56 being provided with poises 59 and 60 for setting off the desired weight on the auxiliary and tare beams.

It is to be noted that in using the scale it is not absolutely necessary that the scale be in a level position as the compensating arrangement of the sector arms 10 and 12 and the eccentric 9 will insure the balance of the scale and its proper operation even though it is out of vertical alignment.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. In a weighing scale, a pair of load counterbalancing pendulums having sector arms extending therefrom, one toward the other, each of said sector arms having two distinct arcuate portions of unequal radius of curvature, a flexible tape extending a substantial distance over, and being connected at its ends to the arcuate portions of lesser radius, a second flexible tape extending diagonally of said first tape and interconnecting the arcuate portions of said arms which have the greater radius, said tapes being adapted to prevent movement of one of the pendulums independently of the other, and rotary weight indicating means operatively connected to one of said tapes.

2. In a weighing scale, a pair of load counterbalancing pendulums mounted with their fulcrums spaced horizontally and vertically, sector arms projecting from the pendulums, each of said sector arms having two distinct arcuate portions of unequal radius of curvature, means interconnecting the sector arms comprising a first flexible tape interconnecting the arcuate portions of lesser radius, a second tape extending diagonally of the first tape and interconnecting the arcuate portions of greater radius, said second tape being connected to the upper sector arm at a point below the point at which it is connected to the lower sector arm, whereby to prevent relatively independent movement of the pendulums, weight indicating means comprising a member connected to said first tape for movement thereby, and a rotary indicating element in driven relation with said member.

3. In a weighing scale, a pair of load counterbalancing pendulums mounted with their fulcrums spaced horizontally and vertically, sector arms projecting from the pendulums, each of said sector arms having two distinct arcuate portions of unequal radius of curvature, a flexible tape connected to and vertically spanning the curved surfaces of the arcuate portions of lesser radius, a second flexible tape extending diagonally of the first tape and interconnecting said arcuate portions of greater radius, said second tape being connected to the upper sector arm at a point below the point at which it is attached to the lower sector arm, and coacting with the first tape to prevent movement of one of the pendulums independently of the other, a vertical rack bar connected at its upper end to said first tape, a pinion meshing with said rack bar, and indicator means operatively connected to said pinion.

4. In a weighing scale, a pair of load counterbalancing pendulums having their fulcrums mounted in horizontal and vertical spaced relation, said pendulums having sector arms projecting laterally from their fulcrumed ends, one toward the other, the arcuate faces of said sector arms being dimensioned and arranged to have a common vertical tangent; a first tape extending vertically between, thence along, and being attached at its ends to the arcuate faces of said sector arms, a second tape extending diagonally of said first tape between the arcuate faces of said sector arms, said second tape being connected to the upper sector arm at a point below the point at which it is connected to the lower sector arm, said tapes coacting to hold said pendulums against independent movement; a vertical rack bar connected to said first tape, to be moved thereby, and indicator means operatively connected to said rack bar.

HARLAN A. HADLEY.